S. W. MORROW.
PISTON PACKING RING.
APPLICATION FILED APR. 21, 1919.

1,349,728.

Patented Aug. 17, 1920.

Inventor:
Samuel Wilson Morrow,
by Spear, Middleton, Donaldson & Spear
Attys.

UNITED STATES PATENT OFFICE.

SAMUEL WILSON MORROW, OF BALTIMORE, MARYLAND, ASSIGNOR TO THE REUS BROS. COMPANY, A CORPORATION OF MARYLAND.

PISTON PACKING-RING.

1,349,728.  Specification of Letters Patent.  Patented Aug. 17, 1920.

Application filed April 21, 1919. Serial No. 291,565.

*To all whom it may concern:*

Be it known that I, SAMUEL WILSON MORROW, a citizen of the United States, and resident of Baltimore, Maryland, have invented certain new and useful Improvements in Piston Packing-Rings, of which the following is a specification.

My invention is designed to provide a piston packing ring organization which will insure a close working joint and seal with the cylinder wall and also with the walls of the groove in the piston in which the packing ring is located.

The invention is particularly well adapted for automobile engines and will prevent the passage of oil into the combustion chamber along the cylinder wall and also prevent the escape of gas and will also furnish a seal to prevent the passage of oil and gas into the groove of the piston and under and past the packing ring.

Figure 1:
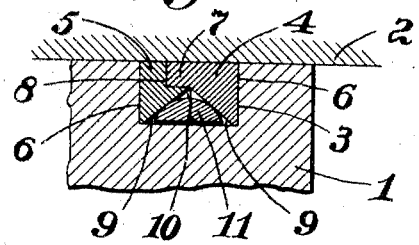
Figure 1 is a sectional view of a portion of a piston and cylinder wall with my improved packing in place.
Figure 2:
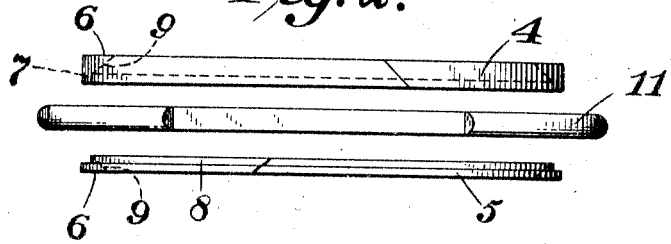
Fig. 2 shows the several parts of the packing ring organization in edge view and separated from each other.
Figure 3:
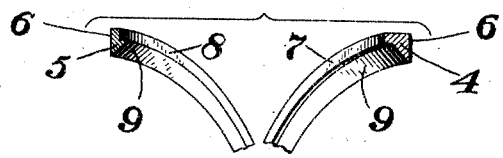
Fig. 3 is a perspective view of a portion of the two main members of the packing ring.

In these drawings 1 indicates a portion of a piston and 2 a portion of the wall of the cylinder.

The piston has a circumferential groove 3 as in ordinary practice and within this groove is located the packing ring organization consisting of a main member 4 and a companion member 5, each of these members being in the form of a split ring having side faces 6 in planes at right-angles to the axis of the rings and of the piston and cylinder, so that when these members are in place within the groove of the piston the faces 6 will fit throughout their extent against the side walls of the groove. The two members 4 and 5 are interlocked by a rib 7 on the member 4 fitting into a recess 8 in the member 5. This rib 7 extends annularly around the edge of the member 4 and the recess 8 likewise extends annularly around the edge of the member 5. Each member is formed with an inner face 9 extending at an inclination to the axis of the ring, these faces diverging inwardly from the point 10 where they meet at the base of the lip or rib 7 and recess 8.

When the parts 4 and 5 are in coöperative relation annular space is provided between them of triangular shape in cross section and in this space a spreader member 11 is located having its outer face rounded. This spreader member is made of spring material and is open or split at one point, and when in place it exerts pressure outwardly against the split ring packing members 4 and 5 to press them with their outer or circumferential faces against the cylinder wall to form a seal at this point against the passage of oil, gas or products of combustion and further the pressure from the spreader ring acting on the inclined surfaces 9 of the packing ring members tends to spread them laterally away from each other, and hence they are firmly pressed against the side walls of the groove in which they lie, forming a sealed joint at each of these points, so that the oil and gas is prevented from passing down and under the packing ring organization and up on the other side, thus preventing the passage of oil to the combustion chamber, or the escape of gas therefrom past the piston. Member 11 is, preferably wholly contained within the groove formed by the inclined faces 9 of the two split ring members. By giving to member 11 an arc shaped bearing face and a base corresponding to the chord of said arc, a large ring may be used in a comparatively shallow groove. As shown in Fig. 1, the base member 11 being greater than one-half the width of the groove, permits the spring member to be securely held in place by one of the split ring members while assembling the organization.

Further it will be noticed that by reason of the interlock afforded by the rib 7 and recess a sealed joint will be maintained between the ring members 4 and 5 themselves, thus preventing the passage of oil or gas inwardly between the adjacent faces or edges of these members.

Furthermore by reason of this interlocking joint between the ring members they will be held accurately in their prescribed relation with their side walls in planes at right-angles to the axis of the piston, so that contact will be accorded throughout these side faces with the side walls of the groove and also the peripheral faces of the rings will be maintained concentric with the axis of the piston and cylinder to insure contact throughout these peripheral faces and the cylinder wall.

The interlocking rib and recess form a guiding connection between the two ring members, so that as they separate under wearing conditions they will maintain their true relation to each other with their side faces to bear throughout against the walls of the grooves and with their peripheral faces to bear throughout against the cylinder wall.

What I claim is:

1. A piston packing consisting of three ring-shaped members, one having a recess at its inner corner open peripherally and laterally and having an inner frusto-conical surface extending from the inner corner of the recess toward the axis of the ring, a second member having a rib overlapping into said recess and having an inner frusto-conical surface extending from the base of the rib toward the axis of the ring said frusto-conical surfaces meeting at substantially the center of the ring and coöperating to form a V shaped groove, and a spring ring bearing on said frusto-conical surfaces said spring ring being of a width greater than half the width of the piston ring groove.

2. A piston packing consisting of three ring-shaped members, one having a recess at its inner corner open peripherally and laterally and having an inner frusto-conical surface extending from the plane of the inner corner of the recess toward the axis of the ring, a second member having a rib overlapping into said recess and having an inner frusto-conical surface extending from the plane of the base of the rib toward the axis of the ring, said frusto-conical surfaces meeting at substantially the center of the ring and coöperating to form a V shaped groove, and a spring ring bearing on said frusto-conical surfaces, said spring ring being of a width greater than half the width of the piston ring groove.

In testimony whereof I affix my signature.

SAMUEL WILSON MORROW